United States Patent
Miyata (10) Patent No.: US 9,063,681 B2
(45) Date of Patent: Jun. 23, 2015

(54) PRINTING SYSTEM

(75) Inventor: Yuji Miyata, Kitanagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 1288 days.

(21) Appl. No.: 12/732,633

(22) Filed: Mar. 26, 2010

(65) Prior Publication Data

US 2010/0302580 A1    Dec. 2, 2010

(30) Foreign Application Priority Data

May 27, 2009    (JP) ................................ 2009-127824

(51) Int. Cl.
*G06F 15/00*    (2006.01)
*G06F 3/12*    (2006.01)
*G06T 1/00*    (2006.01)
*H04N 1/32*    (2006.01)

(52) U.S. Cl.
CPC ............ *G06F 3/1243* (2013.01); *G06F 3/1206* (2013.01); *G06F 3/1238* (2013.01); *G06T 1/0021* (2013.01); *H04N 1/32122* (2013.01); *H04N 1/32144* (2013.01); *H04N 2201/3254* (2013.01); *H04N 2201/3271* (2013.01); *H04N 2201/3278* (2013.01)

(58) Field of Classification Search
USPC ...................................... 358/1.15, 1.16, 1.17
See application file for complete search history.

(56) References Cited

U.S. PATENT DOCUMENTS

| | | | |
|---|---|---|---|
| 7,062,454 B1 * | 6/2006 | Giannini et al. | 705/26.81 |
| 7,251,047 B2 * | 7/2007 | Meade, II | 358/1.13 |
| 7,612,899 B2 | 11/2009 | Kadota | |
| 7,624,359 B2 | 11/2009 | Naito | |
| 7,768,665 B2 * | 8/2010 | Kadota | 358/1.15 |
| 7,817,299 B2 | 10/2010 | Ishizaki | |
| 2004/0168130 A1 | 8/2004 | Ishizaki | |

(Continued)

FOREIGN PATENT DOCUMENTS

| JP | 11-98340 | 4/1999 |
|---|---|---|
| JP | 2002-142051 | 5/2002 |

(Continued)

OTHER PUBLICATIONS

Japanese Official Action dated Apr. 26, 2011 together with an English language translation from JP 2009-127824.

(Continued)

*Primary Examiner* — Vincent Rudolph
*Assistant Examiner* — Lawrence Wills
(74) *Attorney, Agent, or Firm* — Scully, Scott, Murphy & Presser, P.C.

(57) ABSTRACT

A printing system includes a host computer and a server computer communicable with the host computer via a network. The host computer includes a first transmitting unit that transmits image data and position data indicating a position of a storage area in a storage unit. The storage area stores supplementary image data. The server computer includes an image acquiring unit, a combining unit, and a second transmitting unit. The image acquiring unit acquires the supplementary image data from the storage area based on the position data. The combining unit combines the image data transmitted from the host computer and the acquired supplementary image data to create composite image data. The second transmitting unit transmits the composite image data to a printer to print an image corresponding to the composite image data.

10 Claims, 8 Drawing Sheets

(56) References Cited

U.S. PATENT DOCUMENTS

| | | |
|---|---|---|
| 2005/0052693 A1 | 3/2005 | Kadota |
| 2005/0088684 A1* | 4/2005 | Naito et al. ................ 358/1.15 |
| 2005/0102618 A1 | 5/2005 | Naito |
| 2006/0033947 A1 | 2/2006 | Kadota |
| 2006/0126095 A1 | 6/2006 | Tamura et al. |
| 2008/0052301 A1* | 2/2008 | Miyata ......................... 707/100 |
| 2009/0254987 A1* | 10/2009 | Sugita et al. .................... 726/17 |
| 2010/0039663 A1* | 2/2010 | Ohsone ....................... 358/1.15 |

FOREIGN PATENT DOCUMENTS

| | | |
|---|---|---|
| JP | 2004-260273 | 9/2004 |
| JP | 2005-115759 | 4/2005 |
| JP | 2005-84898 A | 5/2005 |
| JP | 2006-53658 | 2/2006 |
| JP | 2006-166155 | 6/2006 |
| JP | 2006-236390 A | 9/2006 |
| JP | 2008-52552 | 3/2008 |
| JP | 2008-217088 A | 9/2008 |
| JP | 2008-235977 | 10/2008 |
| JP | 2009-033512 | 2/2009 |

OTHER PUBLICATIONS

Office Action dated Dec. 20, 2011 received from the Japanese Patent Office from related Japanese Application No. 2009-127824, together with an English-language translation.

* cited by examiner

| ITEM | VALUE |
|---|---|
| WATERMARK | ON |
| BITMAP FILENAME | C:¥DataFolder¥Logo.BMP |
| CLIENT PC | PC-A |
| USERNAME | |
| PASSWORD | |

FIG.4B

| ITEM | VALUE |
|---|---|
| WATERMARK | ON |
| BITMAP FILENAME | ¥¥PC-A¥Share090414¥Logo.BMP |
| CLIENT PC | PC-A |
| USERNAME | SharePrint |
| PASSWORD | abcdefg |

FIG.8

PRINTING SYSTEM

CROSS REFERENCE TO RELATED APPLICATION

This application claims priority from Japanese Patent Application No. 2009-127824 filed May 27, 2009. The entire content of the priority application is incorporated herein by reference.

TECHNICAL FIELD

The present invention relates to a printing system that includes a host computer and a server computer connected to the host computer via a network, the server computer functioning to control printing operations on a printing device based on print jobs received from the host computer. The present invention also relates to a computer-readable storage medium storing a computer-executable program executed on the printing system.

BACKGROUND

A conventional printing system well known in the art employs a server computer for receiving print jobs from a host computer and for controlling the printing process of a printing device. This conventional printing system can reduce the processing load on the host computer and printing device for executing printing operations.

One such printing system in the prior art proposes a method for combining a desired supplementary image to the image created on and received from the host computer for printing. In this printing system, the server computer stores such supplementary images on a hard disk drive. The server computer selects the requested supplementary image from the stored images, combines the selected image with the image to be printed and instructs the printing device to print the composite image.

SUMMARY

However, in the conventional printing system described above, the supplementary images that can be combined with the image to be printed are limited to those supplementary images pre-stored in the hard disk drive of the server computer.

In view of the foregoing, it is an object of the present invention to provide a printing system and a computer-readable storage medium storing a computer-executable program executed on the printing system capable of combining supplementary images, including supplementary images not stored on the server computer, with an image to be printed.

In order to attain the above and other objects, there is provided a printing system including a host computer and a server computer communicable with the host computer via a network. The host computer includes a first transmitting unit that transmits image data and position data indicating a position of a storage area in a storage unit. The storage area stores supplementary image data. The server computer includes an image acquiring unit, a combining unit, and a second transmitting unit. The image acquiring unit acquires the supplementary image data from the storage area based on the position data. The combining unit combines the image data transmitted from the host computer and the acquired supplementary image data to create composite image data. The second transmitting unit transmits the composite image data to a printer to print an image corresponding to the composite image data.

According to another aspect of the present invention, there is provided a host computer communicable with a server computer via a network. The host computer includes a transmitting unit that transmits image data and position data to the server computer. The position data indicates a position of a storage area in a storage unit. The storage area stores supplementary image data.

According to another aspect of the present invention, there is provided a printing method used in a printing system including a host computer and a server computer communicable with the host computer via a network. The printing method includes: on the host computer, transmitting image data and position data to the server computer, the position data indicating a position of a storage area in a storage unit, the storage area storing supplementary image data, and on the server computer, acquiring the supplementary image data from the storage area based on the position data; combining the image data transmitted from the host computer and the acquired supplementary image data to create composite image data; and transmitting the composite image data to a printer to print an image corresponding to the composite image data.

DETAILED DESCRIPTION

Next, preferred embodiments of the present invention will be described while referring to the accompanying drawings.

First Embodiment

(1.1) Structure of Printing System

Figure 1:
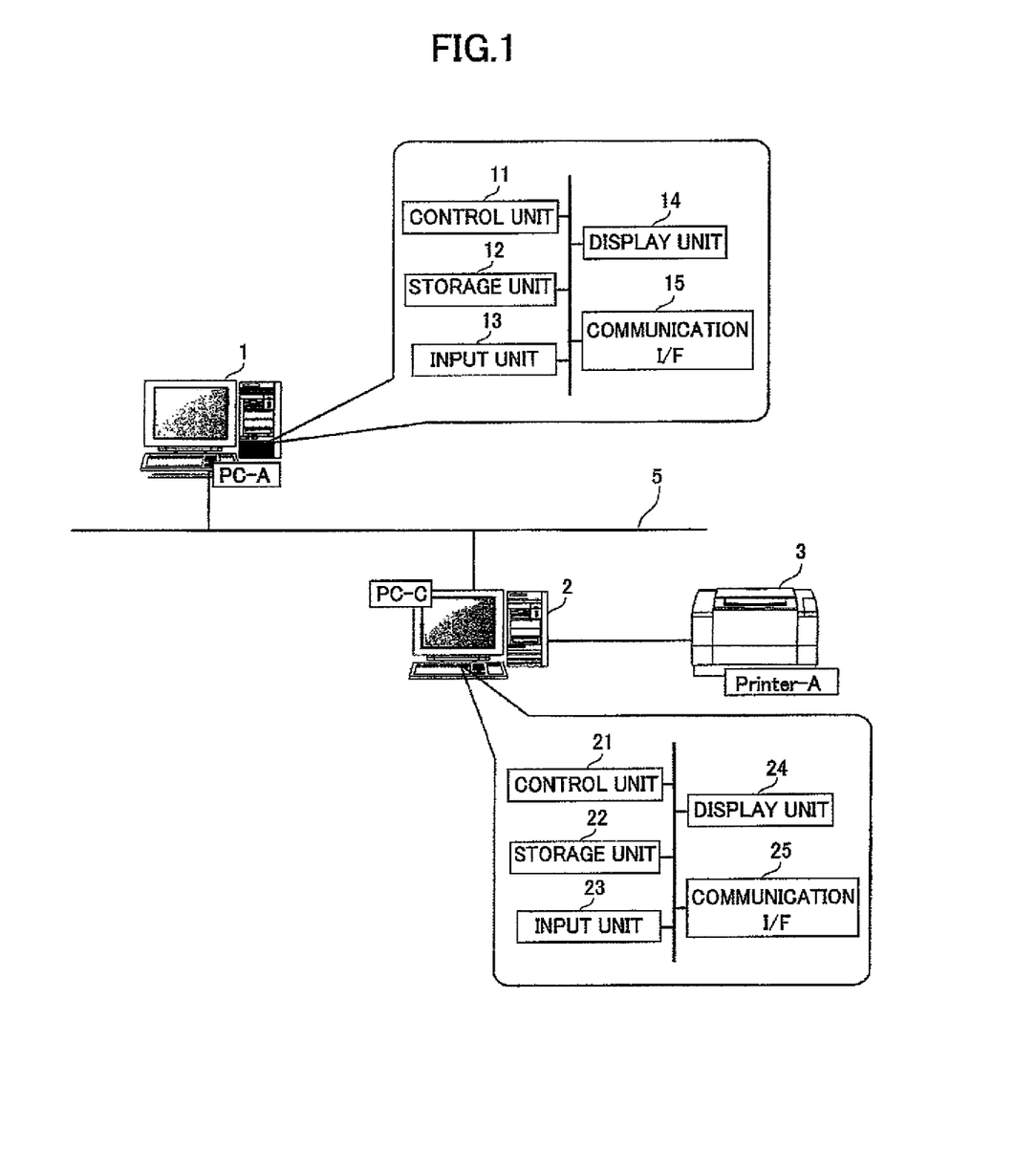
FIG. 1 is an explanatory diagram showing a general structure of a printing system according to a first embodiment of the present invention.

FIG. 1 is an explanatory diagram showing the general structure of a printing system according to a first embodiment.

As shown in FIG. 1, the printing system includes a host computer 1 (PC-A), a server computer 2 (PC-C), and a printing device 3 (Printer-A). The host computer 1 and the server computer 2 are connected via a network 5, such as a local area network (LAN). The printing device 3 is connected to the server computer 2.

The host computer 1 is a common computer system that includes a control unit 11, a storage unit 12, an input unit 13, a display unit 14, and a communication interface (I/F) 15. The communication I/F 15 communicates with other devices over a network.

The control unit 11 is primarily configured of a CPU, ROM, and RAM. The control unit 11 performs overall control of each component in the host computer 1 and executes such processes as a print job transmission process and a temporary folder deletion process based on programs stored in ROM or the storage unit 12.

The storage unit 12 is a hard disk drive or other storage device that stores programs and various data. Data is written to and read from the storage unit 12 through control by the control unit 11.

The input unit 13 is configured of input devices, such as a keyboard and mouse. When a user operates one of the input devices, the input unit 13 acquires operation data corresponding to the user operation and inputs this data into the control unit 11.

The display unit 14 is a display device with a screen configured of a liquid crystal display, for example. The display unit 14 displays data based on output from the control unit 11.

The host computer 1 can create target images for printing through an application running based on a program stored in the storage unit 12.

An operating system (OS) is also installed on the host computer 1 as basic software for managing the entire computer system. The OS in the preferred embodiment has a function for restricting access to folders on the host computer 1 from external computers.

Here, this OS function for restricting access to folders will be described. The OS creates and stores folder settings for each folder stored in the storage unit 12. These folders settings include a shared setting (i.e., an option for sharing the folder), usernames for users having access privileges, a password associated with each username, and the like.

The shared setting indicates whether the folder may be accessed from an external computer. Folders with the shared setting enabled are treated as shared folders that can be accessed by external computers.

When the OS receives an access request for a shared folder from an external computer, the OS extracts the username and password accompanying the access request and allows the external computer access to the shared folder under the conditions that the access request is received from a user with access privileges and that the acquired password is correct.

The server computer 2 is a common server device that includes a control unit 21, a storage unit 22, an input unit 23, a display unit 24, and a communication interface (I/F) 25. The communication I/F 25 serves to communicate with external devices via a network. The control unit 21, storage unit 22, input unit 23, display unit 24, and communication interface 25 have identical structures to the control unit 11, storage unit 12, input unit 13, display unit 14, and communication interface 15 in the host computer 1 described above.

The control unit 21 executes a print control process described later for converting images to be printed based on a print job received from the host computer 1 to a page description language (PDL) and for transmitting this data to the printing device 3.

The printing device 3 executes a printing process based on print data in a PDL format received from the server computer 2. Although not shown in the drawings, the printing device 3 includes a paper cassette loaded with stacked sheets of paper, a conveying unit for conveying the sheets of paper from the paper cassette, and an image-forming unit for printing images on the sheets conveyed by the conveying unit.

In order to use the printing device 3 for printing an image created on the host computer 1 using an application, the host computer 1 transmits a print job including the image to be printed and print settings to the server computer 2.

Figure 2:
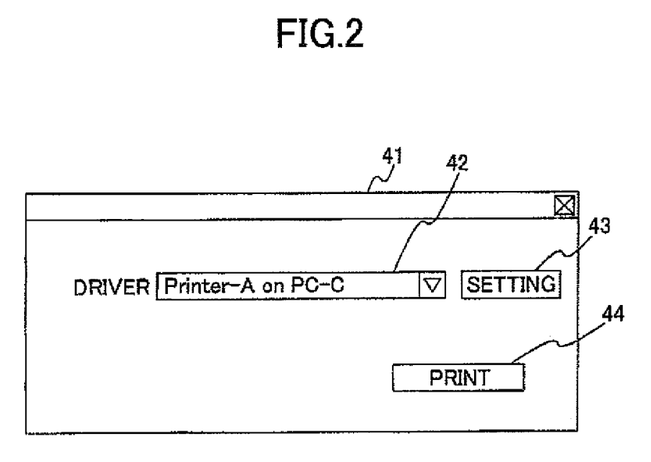
FIG. 2 is an explanatory diagram showing a driver selection screen according to the first embodiment of the present invention.

A print job is transmitted using a driver selection screen 41 shown in FIG. 2. The host computer 1 displays the driver selection screen 41 when the user performs an operation in an application to begin printing an image created on the application, for example. The driver selection screen 41 includes a driver drop-down list 42 displaying the printing device currently selected for executing the printing process. Using the driver drop-down list 42, the user can select and change the printing device used for performing a printing process.

The driver selection screen 41 also includes a setting button 43 that the user selects in order to modify print settings, such as a bitmap watermark setting, and a print button 44 that the user selects to transmit the print job to the server computer 2.

Figure 3:
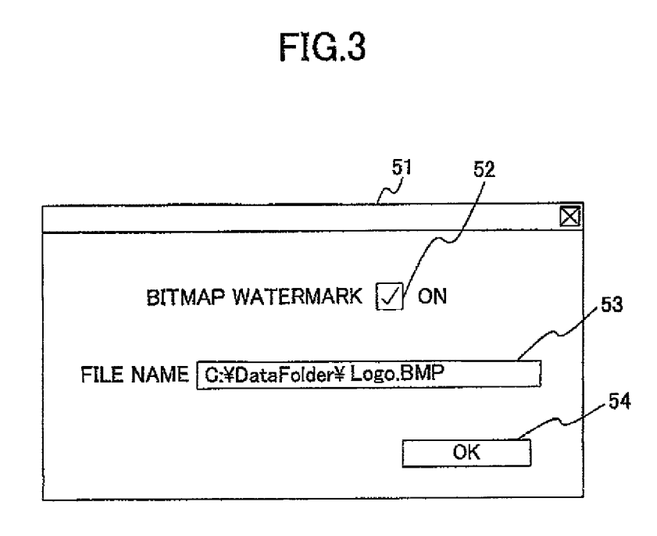
FIG. 3 is an explanatory diagram showing a bitmap watermark setup window according to the first embodiment of the present invention.

When the user clicks on the setting button 43, the host computer 1 displays a bitmap watermark setup window 51 (hereinafter simply referred to as the "watermark setup window 51") shown in FIG. 3. The watermark setup window 51 includes a checkbox 52. The checkbox 52 indicates whether a watermark is to be printed together with the target image. That is, when the checkbox 52 is on, the watermark is printed together with the target image.

The watermark setup window 51 also includes a filename text box 53 for indicating the filename of a watermark image to be combined with the target image. The user can change the watermark that is to be combined with the target image by changing the filename in the filename text box 53. The filename includes path data indicating where the file is stored. In the preferred embodiment, watermark files are stored on the host computer 1 (PC-A).

Figure 4A:
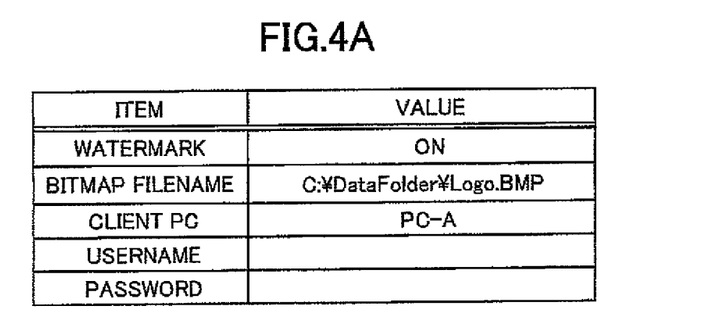
FIGS. 4A and 4B show data tables of print settings according to the first embodiment of the present invention.

The watermark setup window 51 also includes an OK button 54. After selecting or deselecting the checkbox 52 and setting a filename in the filename text box 53, the user presses the OK button 54 to update the print settings. These print settings are stored in RAM or in the storage unit 12 as a data table, such as that shown in FIG. 4A. The filename in the filename text box 53 corresponds to a watermark filename in the data table in FIG. 4A. The watermark filename in FIG. 4A represents a filename of the watermark and a folder storing the watermark file.

In the example of the preferred embodiment, the watermark setup window 51 is displayed for performing watermark settings when the user presses the setting button 43 in the driver selection screen 41, but the window displayed when the user clicks the setting button 43 may also allow the user to input other common print settings. The watermark setup window 51 may also be displayed when modifying settings for the printing device 3, for example, and not only when the setting button 43 is pressed.

(1.2) Print Job Transmission Process

Next, steps in a print job transmission process executed on the host computer 1 according to the first embodiment will be described with reference to the flowchart in FIG. 5. The control unit 11 of the host computer 1 executes the print job transmission process when the user presses the print button 44.

In S101 at the beginning of the print job transmission process, the control unit 11 references the data table of print settings to determine whether the watermark setting is ON. The control unit 11 advances to S110 if the watermark setting is OFF (S101: NO) and continues on to S102 if the watermark setting is ON (S101: YES).

In S102 the control unit 11 determines whether the server computer 2 can access the watermark file. In this step, the control unit 11 determines whether the shared setting of the folder storing the watermark file has been enabled, whether the server computer 2 has access privileges to the folder storing the watermark, and whether the server computer 2 has the correct password for the folder storing the watermark. In the same step, the control unit 11 determines whether the filename recorded in the print settings data table is a network filename that can be accessed from external computers.

In the process of S102, the control unit 11 determines whether the server computer 2 has access privileges and whether the server computer 2 has the correct password by referencing the folder settings for the folder currently storing the watermark file to determine whether the username and password that the server computer 2 uses when normally accessing the host computer 1 (that is, when accessing the host computer 1 without using a username and password added to print settings in S108 described later) are appropriate. That is, the control unit 11 determines whether the server computer 2 has access privileges and whether the server computer 2 has the correct password based on the folder settings and the username and password that the server computer 2 uses when normally accessing the host computer 1. The control unit 11 also determines that the server computer 2 has access privileges and a correct password when access privileges and passwords have not been set for a shared folder (i.e., when access to the shard folder is allowed to all external computers).

The filename "C:¥DataFolder¥Logo.bmp" included in the table of FIG. 4A as the bitmap filename is an example of a filename for a file that cannot be accessed by an external computer. Further, the bitmap filename in FIG. 4A indicates a storage position of a bitmap file "Logo.bmp." Since this filename is a local filename used by the host computer 1 to reference a local file, an external computer accessing the host computer 1 cannot access this file. A file that can be accessed from an external computer has a network filename that includes the computer name, such as the filename "¥¥PC-A¥Share090414¥Logo.bmp" shown in the example of FIG. 4B. The folder name "Share090414" in this filename indicates a shared folder.

The control unit 11 determines in S102 that the server computer 2 can access the watermark file when the shared setting of the folder storing the watermark file has been enabled, the server computer 2 has access privileges and the correct password, and the filename recorded in the data file for print settings is a network filename. If any one of these conditions is not met, the control unit 11 determines that the server computer 2 cannot access the watermark file.

The control unit 11 jumps to S110 when determining that access is allowed (S102: YES) and continues on to S103 when determining that access is not allowed (S102: NO).

In S103 the control unit 11 creates a temporary folder in the storage unit 12. The temporary folder will serve to temporarily store a watermark file. The temporary folder may be set with any name that does not duplicate the name of another folder. In this example, the name of the temporary folder is set to "C:¥Temp090414."

In S104 the control unit 11 copies the watermark file stored in the folder (DataFolder) to the temporary folder (Temp090414) created in S103. In S105 the control unit 11 enables the shared setting of the temporary folder. When the shared setting is enabled, the folder must have a shared folder name. In this example, the control unit 11 sets the temporary folder name to "Share090414."

In S106 the control unit 11 sets the access privileges of the temporary folder. In this example, the control unit 11 gives access privileges to the preset user "SharePrint." The control unit 11 also sets a password "abcdefg" associated with the user "SharePrint." The control unit 11 may also set access privileges so that all users can access the temporary folder or may give access privileges to a temporarily created user. However, it is preferable that the access privileges be set so that only the server computer 2 can access the temporary folder.

In S107 the control unit 11 modifies the filename recorded in the data table for print settings. Since the original filename for the watermark filename is a local filename for a file that cannot be accessed from an external computer, such as the filename "C:¥DataFolder¥Logo.bmp" shown in FIG. 4A, the control unit 11 modifies this filename to a network filename indicating a file that can be accessed externally, such as "¥¥PC-A¥Share090414¥Logo.bmp" shown in FIG. 4B.

Figure 4B:
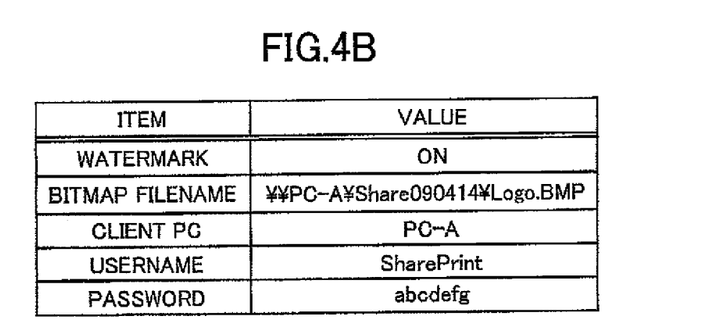

In S108 the control unit 11 adds the username and password set in S106 to the print settings data table. Through the processes performed in S107 and S108, the print settings data table has been modified as shown in FIG. 4B.

In S109 the control unit 11 saves folder data for the temporary folder created in S103 to the storage unit 12. The folder data is the folder name of the temporary folder, as shown in FIG. 6, and is required for deleting the temporary folder in a temporary folder deletion process described later.

In S110 the control unit 11 transmits a print job including the data for the target image and the print settings modified in S107 and S108 to the server computer 2 and subsequently ends the current process.

(1.3) Print Control Process

Next, the steps in a print control process executed on the server computer 2 will be described based on the flowchart in FIG. 7. The control unit 21 of the server computer 2 executes this print control process when a print job is received from the host computer 1.

Figure 7:
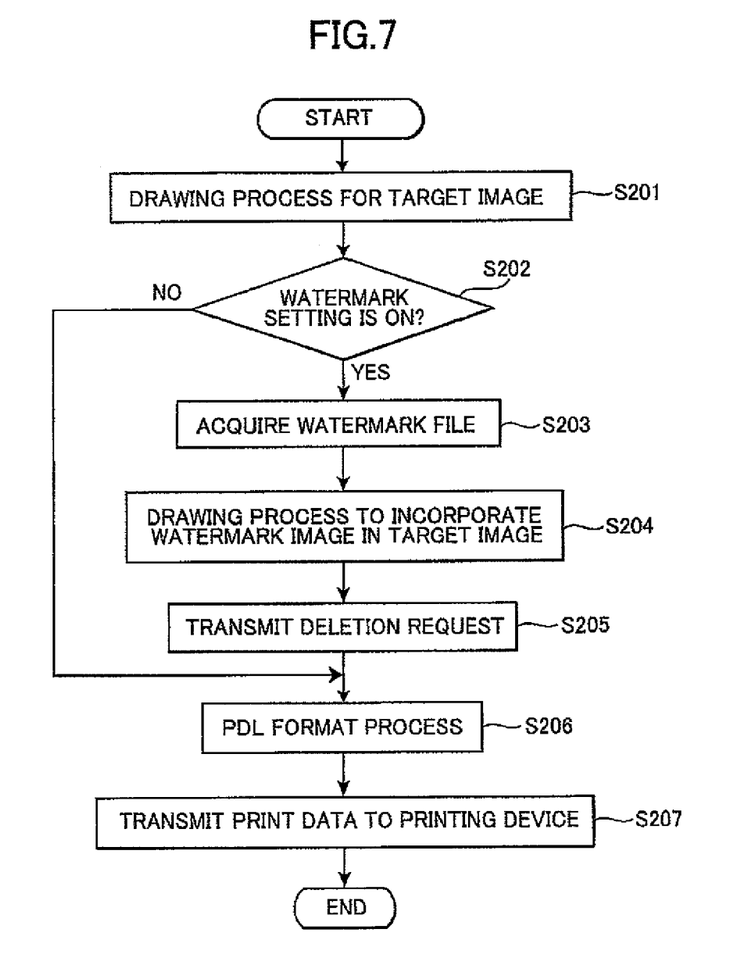
FIG. 7 is a flowchart illustrating steps in a print control process according to the first embodiment of the present invention.

In S201 of the print control process in FIG. 7, the control unit 21 performs a drawing process for the target image received from the host computer 1. In S202 the control unit 21 determines whether the watermark setting for the print job is ON based on the print settings received from the host computer 1. The control unit 21 jumps to S206 if the watermark setting is OFF (S202: NO) and advances to S203 if the watermark setting is ON (S202: YES).

In S203 the control unit 21 acquires the watermark file by accessing the temporary folder on the host computer 1 using the filename, username, and password included in the print settings.

In S204 the control unit 21 performs a drawing process to incorporate the acquired watermark image in the target image drawn in S201. In S205 the control unit 21 transmits a deletion request to the host computer 1 for deleting the temporary folder and the watermark file stored in the temporary folder.

In S206 the control unit 21 converts the data resulting from the drawing process to a PDL format. At this time, the control unit 21 converts the target image drawn in S204 to the PDL format when the watermark setting was ON and converts the target image drawn in S201 to the PDL format when the watermark setting was OFF.

In S207 the control unit 21 transmits the print data converted to the PDL format in S206 to the printing device 3 and subsequently ends the current process. Since the print settings are automatically deleted after the control unit 21 ends the printing process for the print job, data for the filename, username, password, and the like do not remain on the server computer 2.

(1.4) Temporary Folder Deletion Process

Next, steps in the temporary folder deletion process executed on the host computer 1 will be described with reference to the flowchart in FIG. 8. The control unit 11 of the host computer 1 executes this temporary folder deletion process after receiving the deletion request transmitted from the server computer 2 in S205 of the print control process to delete a temporary folder and watermark file.

Figure 8:
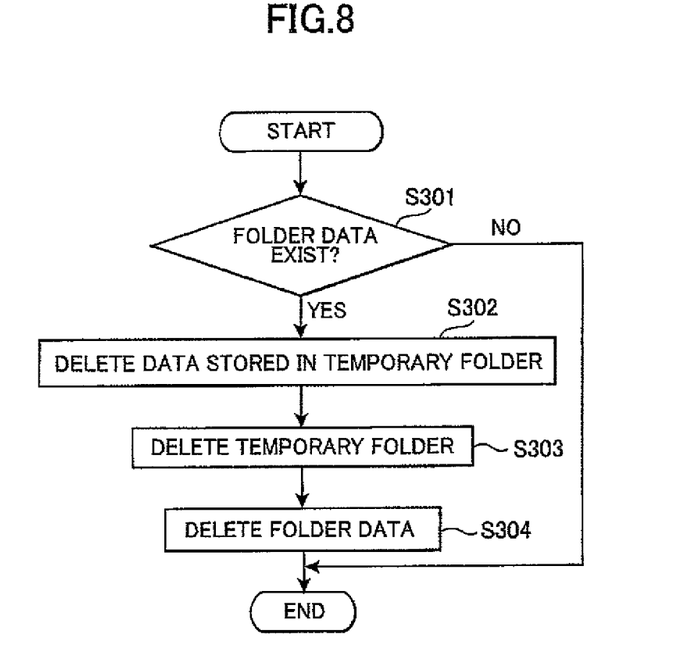
FIG. 8 is a flowchart illustrating steps in a temporary folder deletion process according to the first embodiment of the present invention.

In S301 of the temporary folder deletion process in FIG. 8, the control unit 11 determines whether the folder data exists in the storage unit 12. If the folder data does not exist (S301: NO), indicating that the temporary folder was not created, the control unit 11 ends the current process without executing a process to delete the temporary folder and the like. However, if the folder data exists (S301: YES), in S302 the control unit 11 deletes the watermark file stored in the temporary folder having the folder name indicated in the folder data.

In S303 the control unit 11 deletes the temporary folder and in S304 deletes the folder data. Subsequently, the control unit 11 ends the current process.

(1.5) Operations and Effects of First Embodiment

In the printing system according to the first embodiment described above, when transmitting a print job to the server computer 2 for printing a target image in combination with a watermark image, the host computer 1 shares a temporary folder and sets the username and password having access privileges to the temporary folder for a user. Next, the host computer 1 transmits the filename denoting path data for the watermark file and the username and password required to access the temporary folder holding the watermark file as part of the print job.

Upon receiving the print job, the server computer 2 accesses the temporary folder using the folder name, username, and password received for the temporary folder, acquires the watermark file from the temporary folder, combines the watermark image with the target image provided in the print job, and outputs this composite image to the printing device 3 for printing.

With a printing system having this construction, the server computer 2 can combine a watermark image with an image targeted for printing and can instruct the printing device to print a composite image, even when the watermark file is not stored in a storage device of the server computer 2 itself, and particularly when the watermark file is stored in a previously unshared folder that the server computer 2 could not access via the network 5. Since watermark files need not be stored in the storage unit 22 of the server computer 2, it is possible to increase the number and size of the watermark files without occupying a large portion of the storage unit 22.

Further, since the server computer 2 can recognize the location of the watermark file based on the filename for the watermark in the print settings received from the host computer 1, the server computer 2 can acquire the watermark file even when the location of the watermark file on the network 5 is not prestored on the server computer 2.

Further, the host computer 1 copies the watermark file to the temporary folder created in the storage unit 12 and allows the server computer 2 to access this temporary folder. Since only the watermark file is stored in the temporary folder that is accessible by the server computer 2, an external computer given access to the temporary folder cannot acquire any files other than the watermark file. Further, if the folder that originally stored the watermark file contains additional files other than the watermark file, there is no need to share the entire folder. This configuration enhances security by not allowing the external computer to acquire files other than the watermark file.

Further, the above temporary folder can only be accessed by an external computer to which the host computer 1 has transmitted the username and password required for access privileges. Since an external computer that does not have the correct username and password for access privileges cannot access the temporary folder, this configuration prevents unauthorized access from computers and, hence, enhances security.

Further, the temporary folder is deleted after the server computer 2 acquires the watermark file therefrom. Hence, this configuration reduces the risk of an unauthorized external computer accessing the temporary folder, thereby further enhancing security.

(1.6) Variations of the First Embodiment

While the invention has been described in detail with reference to a first embodiment thereof, it would be apparent to those skilled in the art that many modifications and variations may be made therein without departing from the spirit of the invention, the scope of which is defined by the attached claims.

For example, in the preferred embodiment described above, the watermark file is originally stored on the host computer 1, but the watermark file may be stored by another computer connected to the network 5.

For example, in addition to the configuration of the printing system shown in FIG. 1, a separate data management computer may be connected to the network 5 and may be used to store watermark files. The data management computer has a configuration similar to the host computer 1 and will not be described here. With a printing system having this configuration, the host computer 1 can access watermark files stored on the data management computer.

Thus, in S102 of the print job transmission process, the host computer 1 references a storage device on the data management computer and reads the folder settings for a folder storing a watermark file to determine whether the server computer 2 can access the watermark file stored in the folder of the data management computer. In S104 of the print job transmission process, the host computer 1 acquires the watermark file from the data management computer and copies this watermark file to a temporary folder in the storage unit 12.

In addition to the effects of the first embodiment described above, a printing system configured according to this variation allows the server computer 2 to acquire a watermark file when the host computer 1 does not store such supplementary images and when the server computer 2 cannot access folders on the data management computer.

Further, in S206 of the print control process according to the first embodiment described above, the server computer 2 creates PDL data for a composite image including the target image and watermark image and transmits the PDL data to the printing device 3. However, the process for combining the target image and watermark image may be executed by the printing device 3 instead.

Further, while access is restricted by individual folders in the first embodiment described above, a computer system capable of restricting access to individual files can perform a process to restrict access to the watermark file.

Second Embodiment

A printing system according to a second embodiment of the present invention has the same basic configuration as the printing system according to the first embodiment described above. However, the processes executed by the host computer 1 and server computer 2 in the second embodiment are slightly modified from those in the first embodiment. Below, the modified steps of these processes will be described.

(2.1) Print Job Transmission Process

Next, steps in the print job transmission process executed on the host computer 1 according to the second embodiment will be described with reference to the flowchart in FIG. 9. In the print job transmission process according to the second embodiment, the host computer 1 enables the server computer 2 to access a watermark file without creating a temporary folder. The control unit 11 of the host computer 1 executes this print job transmission process when the user presses the print button 44.

Figure 5:
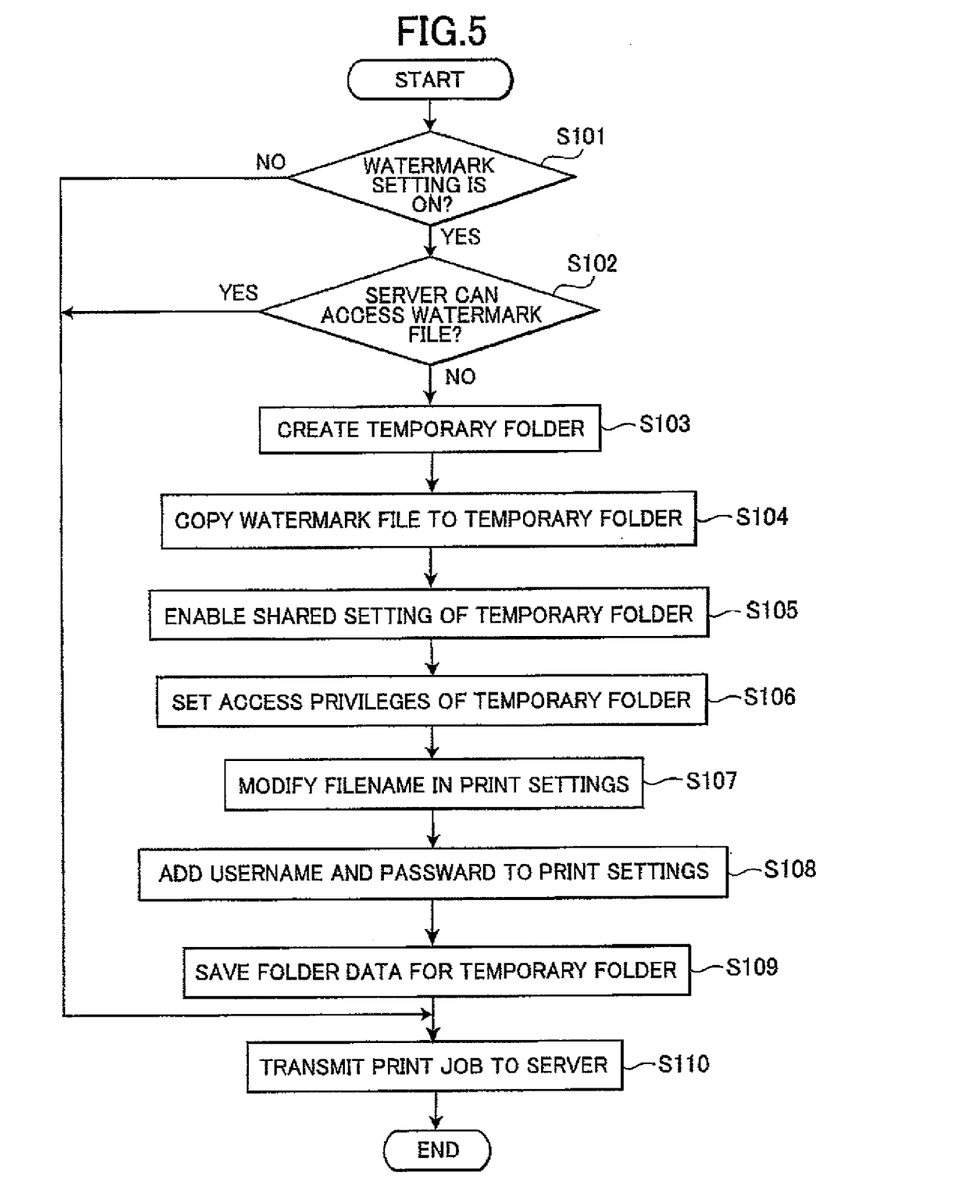
FIG. 5 is a flowchart illustrating steps in a print job transmission process according to the first embodiment of the present invention.
Figure 6:
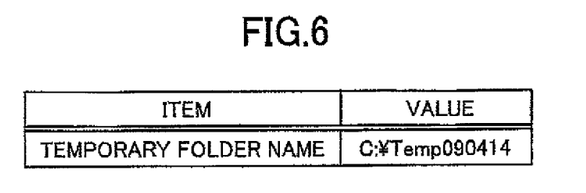
FIG. 6 shows folder data according to the first embodiment of the present invention.
Figure 9:
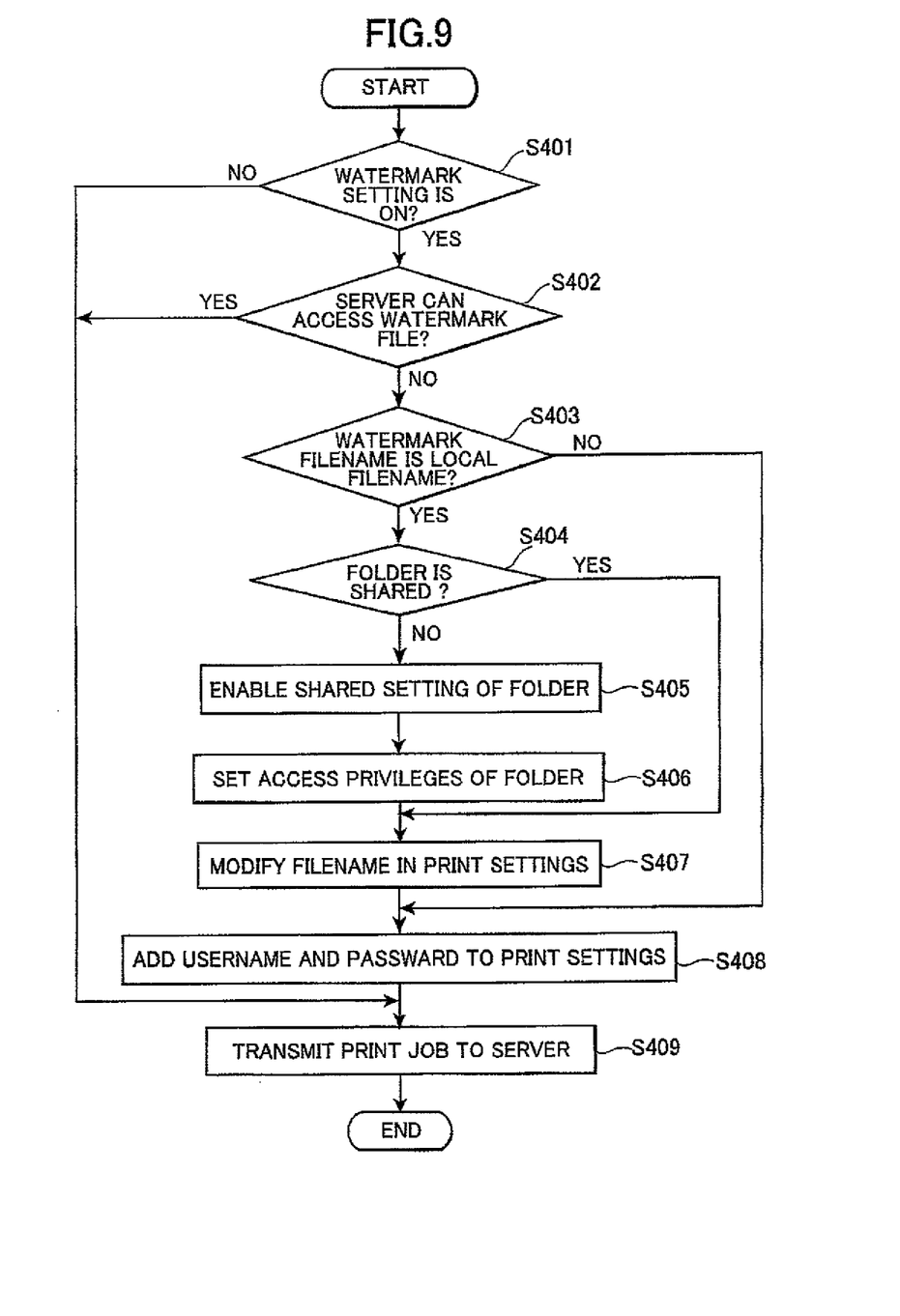
FIG. 9 is a flowchart illustrating steps in a print job transmission process according to a second embodiment of the present invention.

A description of steps S401, S402, S408, and S409 in FIG. 9 will not be given herein, as the steps are identical to S101, S102, S108, and S110 of FIG. 5.

When the control unit 11 determines in S402 that the server computer 2 is unable to access the watermark file (S402:NO), in S403 the control unit 11 determines whether the watermark filename for the file subjected to the determination in S402 is a local filename.

If the control unit 11 determines in S403 that the filename recorded in the print settings data table is not a local filename (S403: NO), then the filename is a network filename. In other words, the folder in which the watermark file is stored is shared. Accordingly, the control unit 11 advances to S408 and adds a username and password to the print settings for allowing the server computer 2 access to the watermark file.

However, if the filename is a local filename (S403:YES), in S404 the control unit 11 determines whether the folder in which the watermark file is stored is already shared.

If the folder is shared (S404: YES), the control unit 11 jumps to S407. However, if the folder is not shared (S404: NO), in S405 the control unit 11 enables the shared setting of the folder and in S406 sets access privileges for the folder. The processes in S405 and S406 are identical to those performed for a temporary folder in S105 and S106 of the first embodiment.

In S407 the control unit 11 sets the filename in the print settings. Here, the control unit 11 modifies the filename in the print settings from a local filename, such as that shown in FIG. 4A, to a network filename, such as that shown in FIG. 4B. Subsequently, the control unit 11 advances to S408 described above.

(2.2) Print Control Process

Figure 10:
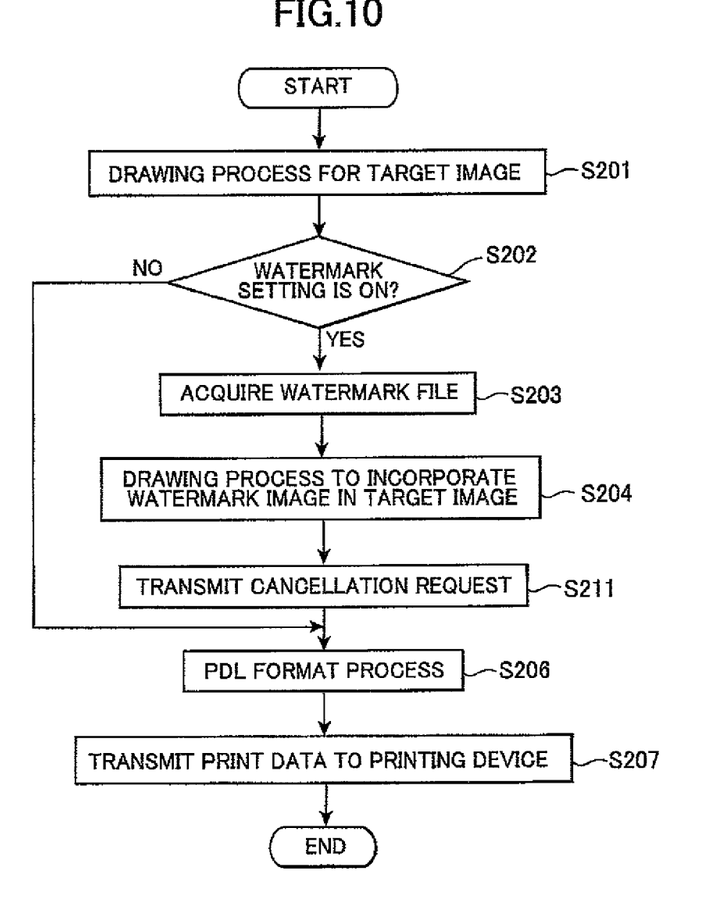
FIG. 10 is a flowchart illustrating steps in a print control process according to the second embodiment of the present invention.

Since the print control process according to the second embodiment is configured by modifying a portion of the print control process according to the first embodiment described above, only the modified parts will be described below. As shown in FIG. 10, the process of S211 is executed in the second embodiment in place of S205 of the first embodiment.

In S211 the control unit 21 transmits a cancellation request to the host computer 1 for disabling the shared setting of the folder storing the watermark file. Upon receiving this cancellation request, the host computer 1 disables the shared setting of the folder storing the watermark file.

(2.3) Operations and Effects of Second Embodiment

As with the printing system according to the first embodiment, the printing system according to the second embodiment is configured so that the server computer 2 can combine a watermark image with a target image and instruct the printing device to print a composite image, even when the watermark file is not stored in a storage device of the server computer 2 itself and particularly when the watermark file is stored in a folder that has not been shared in advance and that the server computer 2 cannot access via the network 5. Further, since the server computer 2 can recognize the location of the watermark file based on the filename received from the host computer 1, the server computer 2 can acquire the watermark file, even though the location of the watermark file on the network 5 is not stored on the server computer 2 in advance.

Further, since the host computer 1 does not create a temporary folder in the second embodiment, the processing load on the host computer 1 can be reduced.

Further, since the shared setting of the folder storing the watermark file is disabled after the server computer 2 acquires the watermark file, the printing system avoids a situation in which the external computer has indefinite access to the folder storing the watermark file, thereby enhancing the security of the system.

(2.4) Variations of the Second Embodiment

As in the variation of the first embodiment described above, a data management computer (PC-B) may be connected to the network 5 in the printing system according to the second embodiment, and the data management computer (PC-B) may store watermark files.

Figure 11:
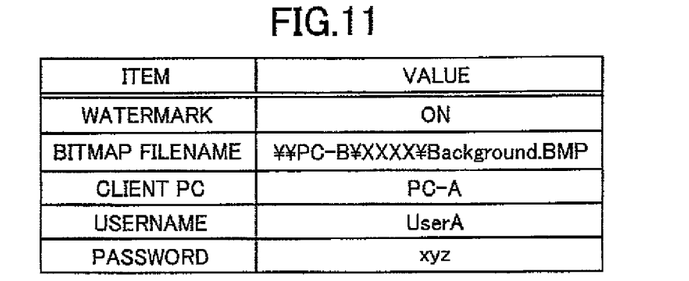
FIG. 11 shows data tables of print settings according to a modification to the second embodiment of the present invention.

When the printing system of the second embodiment has this configuration, the control unit 11 always reaches a negative determination in S403 of the print job transmission process in FIG. 9. The reason for this is because the filename "¥¥PC-B¥XXXX ¥Background.bmp" for the watermark file stored on the data management computer (PC-B) on the network 5 is recorded in the print settings data table, as shown in FIG. 11. Thus, the filename is a network filename.

Upon reaching the negative determination in S403, the control unit 11 jumps to S408 and adds a username and password to the print settings. Here, the control unit 11 adds a username and password used by the server computer 2 in order that the server computer 2 can access the folder on the data management computer (PC-B) in which the watermark file is stored. Accordingly, the print settings transmitted to the server computer 2 in S409 include the filename "¥¥PC-B¥XXXX¥Background.bmp" for the watermark file stored on the data management computer (PC-B), as shown in FIG.

11, and the username "UserA" and password "xyz" for accessing the folder on the data management computer (PC-B) storing the watermark file.

In addition to the effects of the second embodiment described above, a printing system configured according to this variation allows the server computer 2 to acquire a watermark file when the host computer 1 does not store such supplementary images and when the server computer 2 cannot access folders on the data management computer.

Further, in S403 and S404 of the second embodiment described above, the control unit 11 determines the reason that the server computer 2 cannot access the folder in which the watermark file is stored and subsequently performs one of two different processes depending on this reason. However, the control unit 11 may advance directly to S405 after reaching a negative determination in S402, without executing the processes in S403 and S404.

What is claimed is:

1. A printing system comprising:
   a host computer comprising:
      a host computer control device configured to transmit image data and position data indicating a position of a storage area in a storage device to a server computer, the storage area storing supplementary image data, an access privilege being set to the storage area; and the host computer control device further being configured to transmit, to the server computer, information giving the server computer the access privilege to the storage area,
   the server computer communicable with the host computer via a network, the server computer comprising:
      a server computer control device configured to:
         receive the image data, the position data and the information giving the server computer the access privilege to the storage area transmitted from the host computer;
         access the storage area by using the information giving the server computer the access privilege to the storage area and acquire the supplementary image data from the storage area based on the position data;
         combine the image data transmitted from the host computer and the acquired supplementary image data to create composite image data; and
         transmit the composite image data to a printer to print an image corresponding to the composite image data,
      wherein the storage device is provided in the host computer, the storage area being configured to set to either one of a first state that the server computer is inaccessible to the storage area and a second state that the server computer is accessible to the storage area, and
      wherein the host computer control device is further configured to:
         determine whether the storage area sets to the first state or the second state; and
         set the storage area to the second state when the host computer control device determines that the storage area sets to the first state and the host computer control device transmits the image data and the position data to the server computer.

2. The printing system according to claim 1, wherein the host computer control device is further configured to:
   create a temporary storage area; and
   copy the supplementary image data stored in the storage area to the temporary storage area, and
   wherein the position data indicates a position of the temporary storage area.

3. The printing system according to claim 2, wherein the server computer control device is configured to transmit a deletion request to the host computer for deleting the temporary storage area after the server computer control device acquires the supplementary image data from the temporary storage area, and
   wherein the host computer control device is further configured to delete the temporary storage area in response to the deletion request.

4. The printing system according to claim 1, wherein the server computer control device is further configured to transmit a cancellation request to the host computer after the server computer control device acquires the supplementary image data from the temporary storage area, and
   wherein the host computer control device changes the storage area from the second state to the first state in response to the cancellation request.

5. A non-transitory computer readable storage medium storing a set of program instructions, which when installed on and executed by, a computer for controlling a host computer communicable with a server computer via a network, cause the computer to execute a method comprising:
   transmitting image data and position data to the server computer, the position data indicating a position of a storage area in a storage device, the storage area storing supplementary image data, an access privilege being set to the storage area; and
   transmitting, to the server computer, information giving the server computer the access privilege to the storage area,
   wherein the storage device is provided in the host computer, the storage area being configured to set to either one of a first state that the server computer is inaccessible to the storage area and a second state that the server computer is accessible to the storage area, and
   wherein the set of program instructions further cause the computer to:
      determine whether the storage area sets to the first state or the second state; and
      set the storage area to the second state when it is determined that the storage area sets to the first state and the image data and the position data are transmitted to the server computer.

6. The non-transitory computer readable storage medium according to claim 5, wherein the set of program instructions further cause the computer to:
   create a temporary storage area; and
   copy the supplementary image data stored in the storage area to the temporary storage area, and
   wherein the position data indicates a position of the temporary storage area.

7. A non-transitory computer readable storage medium storing a set of program instructions, which when installed on and executed by, a computer for controlling a server computer communicable with the host computer via a network, cause the computer to execute a method comprising:
   receiving image data, position data and information transmitted from the host computer, the position data indicating a position of a storage area in a storage device, the storage area storing supplementary image data, an access privilege being set to the storage area, the information giving the server computer the access privilege to the storage area;
   accessing the storage area by using the information giving the server computer the access privilege to the storage area and acquiring the supplementary image data from the storage area based on the position data;

combining the image data transmitted from the host computer and the acquired supplementary image data to create composite image data;

transmitting the composite image data to a printer to print an image corresponding to the composite image data, transmitting a cancellation request to the host computer after the supplementary image data is acquired from the storage area, the storage area being configured to set to either one of a first state that the server computer is inaccessible to the storage area and a second state that the server computer is accessible to the storage area, wherein the cancellation request is a request to change the storage area from the second state to the first state.

8. The non-transitory computer readable storage medium according to claim 7, wherein a temporary storage area is created in the storage device and copies of the supplementary image data stored in the storage area are stored in the temporary storage area, and wherein the position data indicates a position of the temporary storage area.

9. The non-transitory computer readable storage medium according to claim 8, wherein the set of program instructions further cause the computer to transmit a deletion request to the host computer for deleting the temporary storage area after acquiring the supplementary image data from the temporary storage area.

10. The non-transitory computer readable storage medium according to claim 7, wherein the storage device is provided in the host computer.

* * * * *